Dec. 17, 1935.   M. ROMAINE   2,024,251
BROACHING MACHINE
Filed Jan. 3, 1934   7 Sheets-Sheet 1
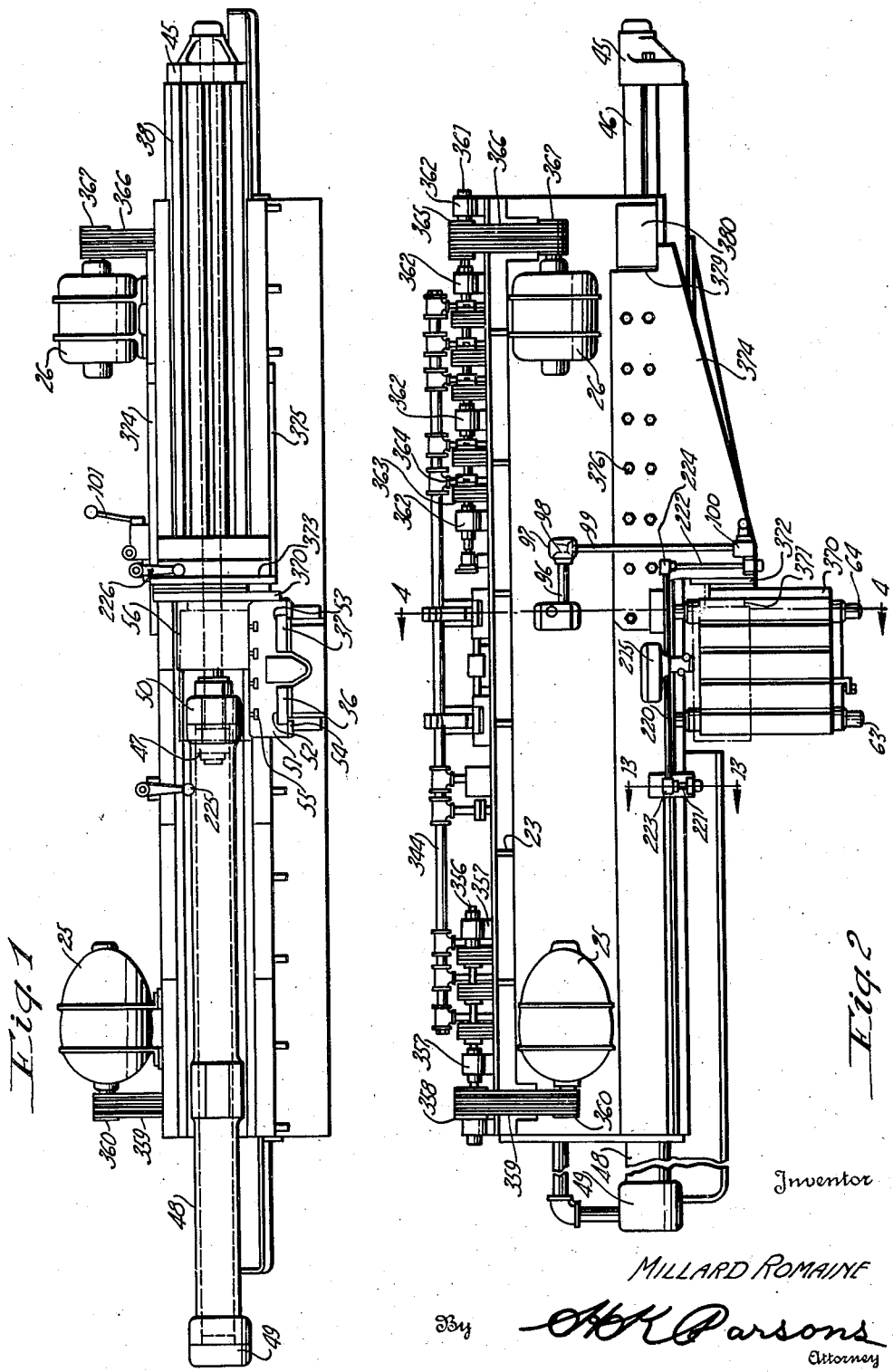
Inventor
MILLARD ROMAINE
By AHK Parsons
Attorney

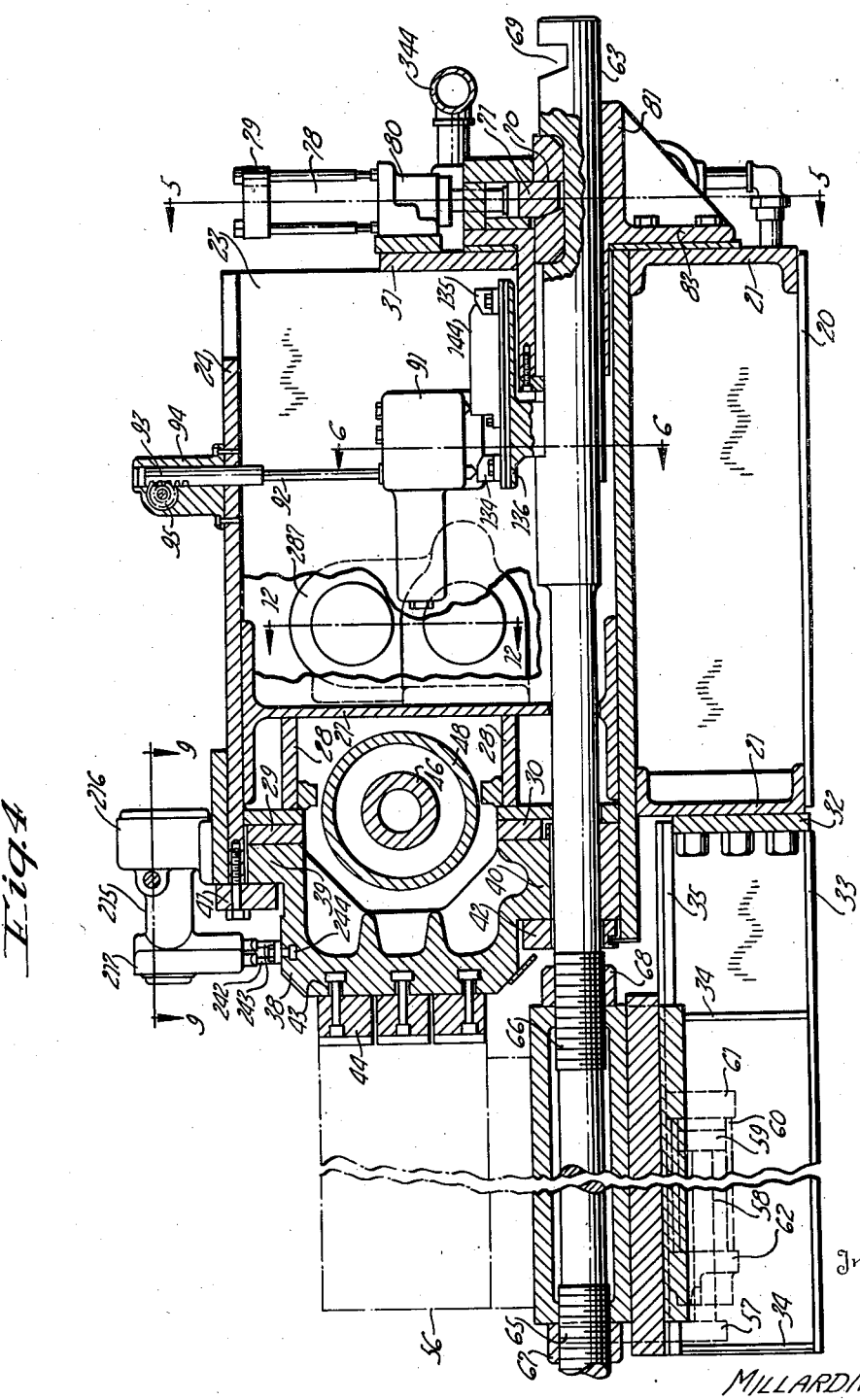

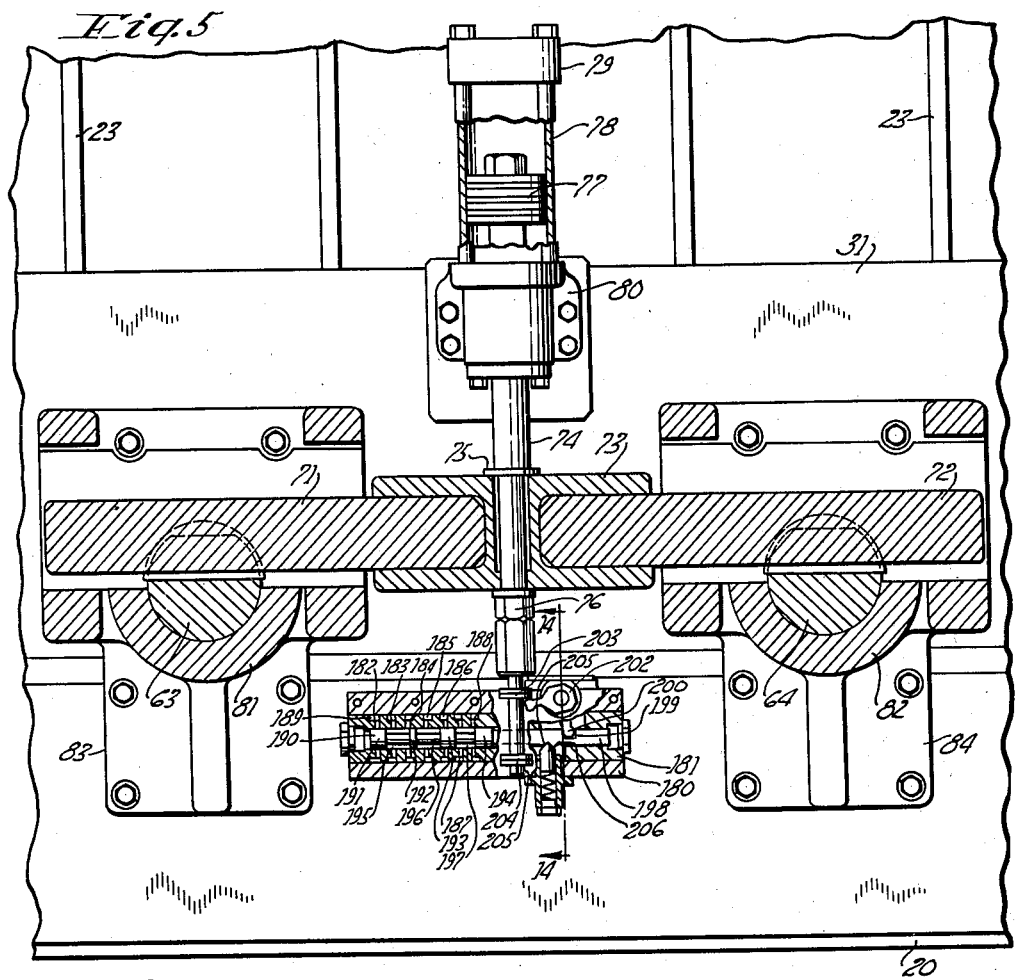
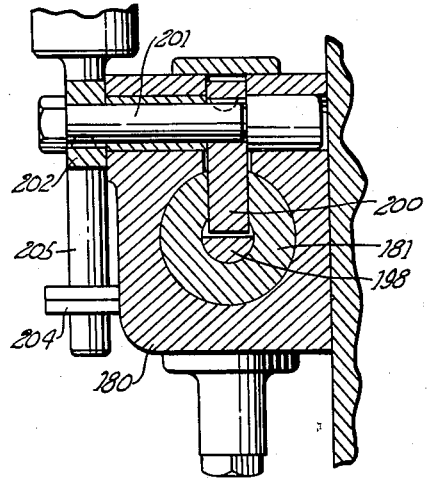
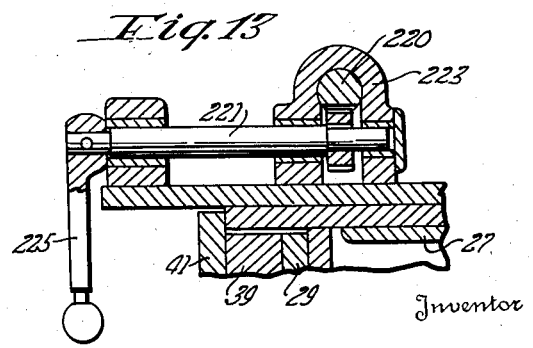

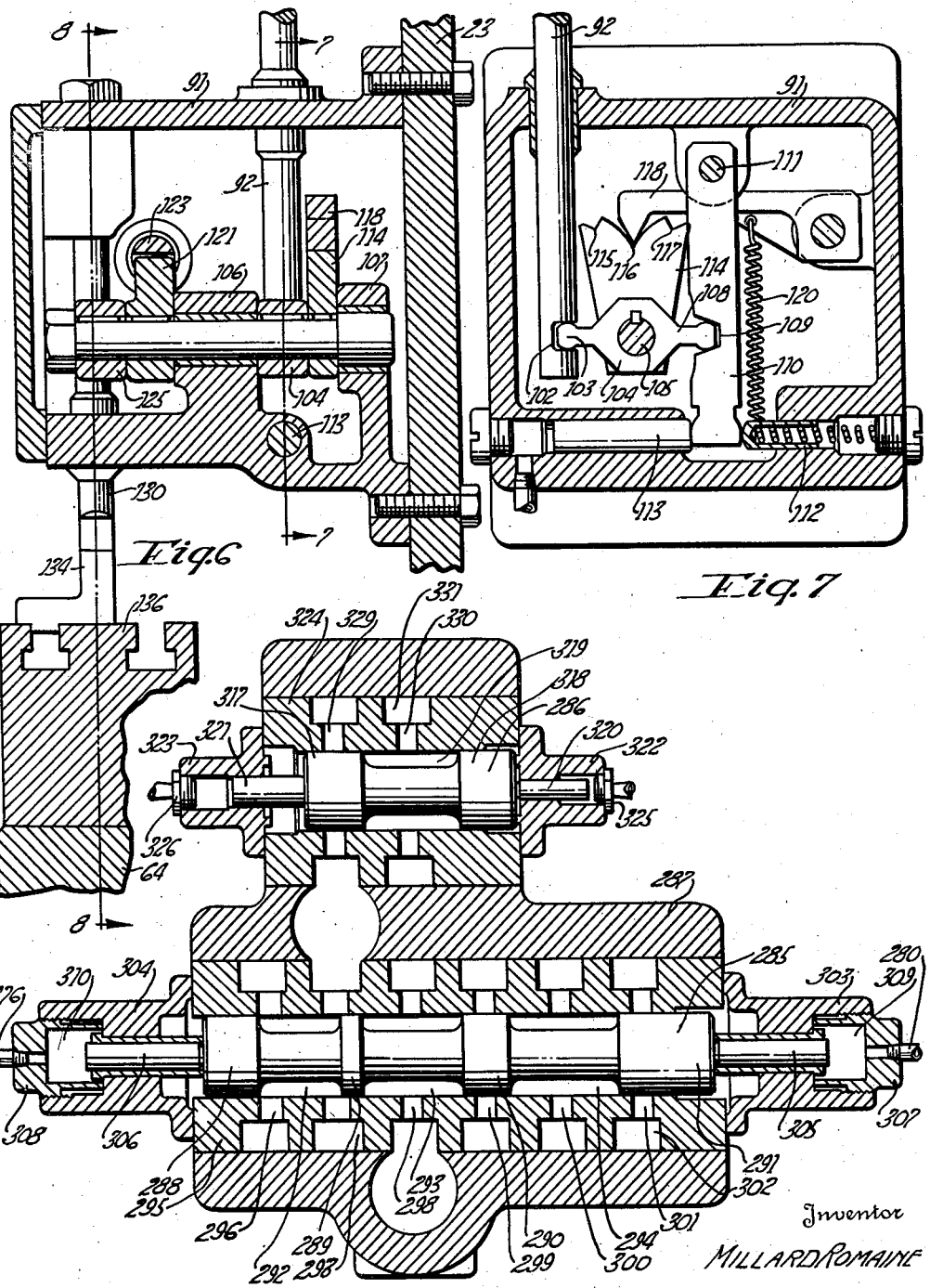

Dec. 17, 1935.  M. ROMAINE  2,024,251
BROACHING MACHINE
Filed Jan. 3, 1934   7 Sheets-Sheet 6

Inventor
MILLARD ROMAINE
By HK Parsons
Attorney

Dec. 17, 1935.                M. ROMAINE                2,024,251
                            BROACHING MACHINE
                         Filed Jan. 3, 1934        7 Sheets-Sheet 7
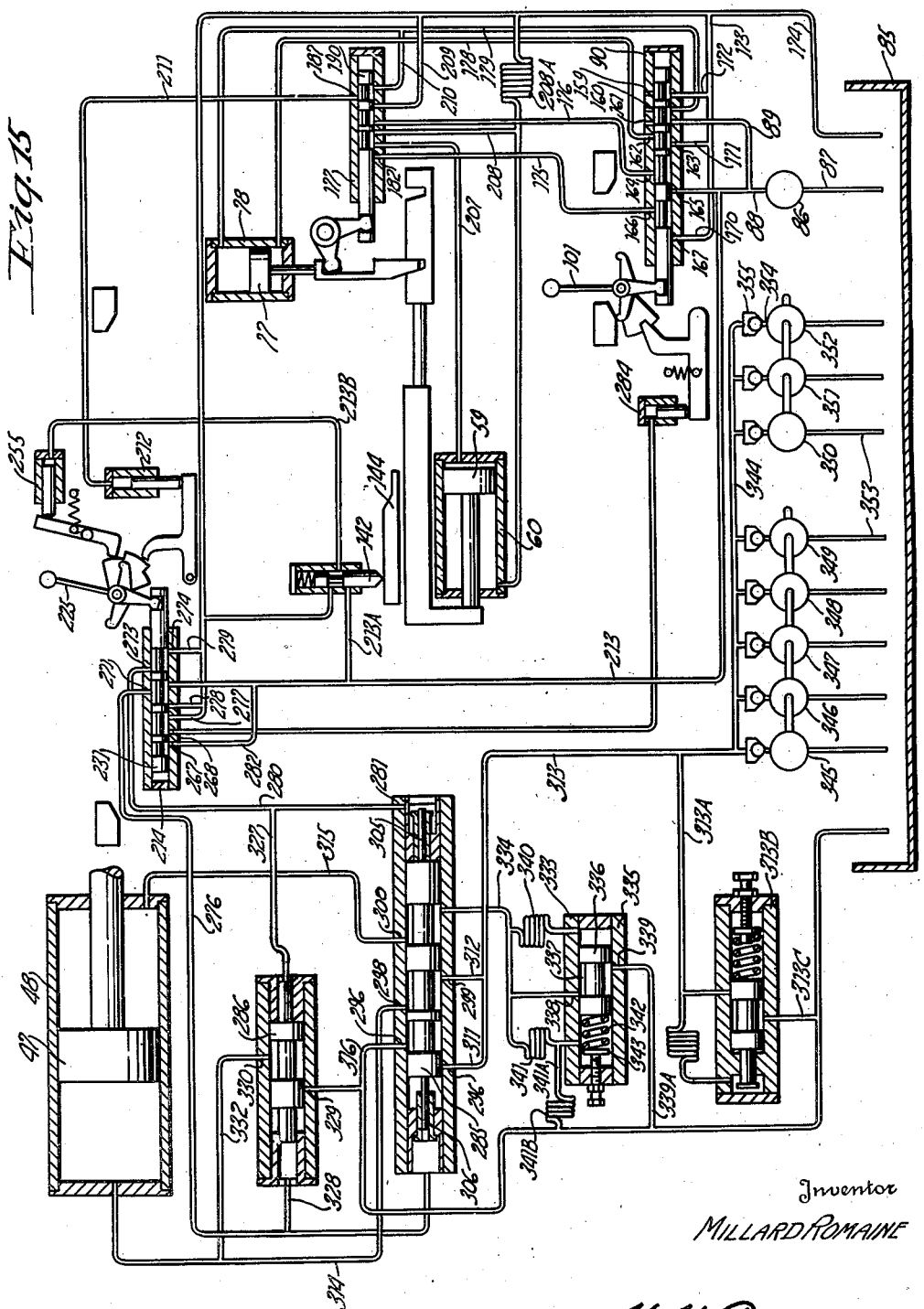
Inventor
MILLARD ROMAINE
By AHK Parsons
Attorney Patented Dec. 17, 1935

2,024,251

UNITED STATES PATENT OFFICE 2,024,251

BROACHING MACHINE

Millard Romaine, Cincinnati, Ohio, assignor to The Cincinnati Milling Machine Co., Cincinnati, Ohio, a corporation of Ohio Application January 3, 1934, Serial No. 705,109

19 Claims. (Cl. 90—33)

This invention relates to improvements in machine tools and particularly to improvements in broaching machines.

An object of the invention is the provision of a broaching machine utilizing a broach tool ram and a work support in which the thrust incident to the broaching operation is taken by the main frame or bed of the machine instead of by the work support ways as is past practice.

Another object of the invention is the provision of an hydraulically actuated broach ram in which the speed of reciprocation of the ram may be progressively increased by definite increments and in which the speed between increments may be infinitely varied.

A further object of the invention is the provision of a broaching machine utilizing a relatively shiftable work support table in which the table is positively locked at each end of its stroke.

A still further object of the invention is the provision of a broaching machine utilizing a relatively movable work supporting table and broaching ram in which the mechanism for effecting said movements of the ram and table is interlocked to prevent inadvertent movement of one or the other or both of said members.

It is also an object of the present invention to provide a broaching machine utilizing relatively movable work support and tool ram, each of which includes a separate actuating train or motive circuit but which trains or motive circuits are locked and interlocked by one another, depending upon the relative positions of said work supporting table and broach tool ram.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevational view of a broaching machine embodying the present invention.

Figure 2 is a top plan view of the machine shown in Figure 1.

Figure 4 is an enlarged fragmentary sectional view taken substantially on line 4—4 of Figure 2.

Figure 5 is a fragmentary sectional view taken on line 5—5 of Figure 4.

Figure 6 is an enlarged fragmentary sectional view taken on line 6—6 of Figure 4.

Figure 7 is a sectional view taken on line 7—7 of Figure 6.

Figure 12 is a sectional view through the ram control valves as seen from line 12—12 of Figure 4.

Figure 13 is a detailed sectional view as seen from line 13—13 on Figure 2.

Figure 14 is an enlarged sectional view taken on line 14—14 of Figure 5.

Figure 15 is a diagrammatic view illustrating the hydraulic circuit involved in this invention and showing diagrammatically the several interlocks and their relation to the circuit.

Throughout the several views of the drawings similar reference characters are employed to denote the same or similar parts.

Figure 3:
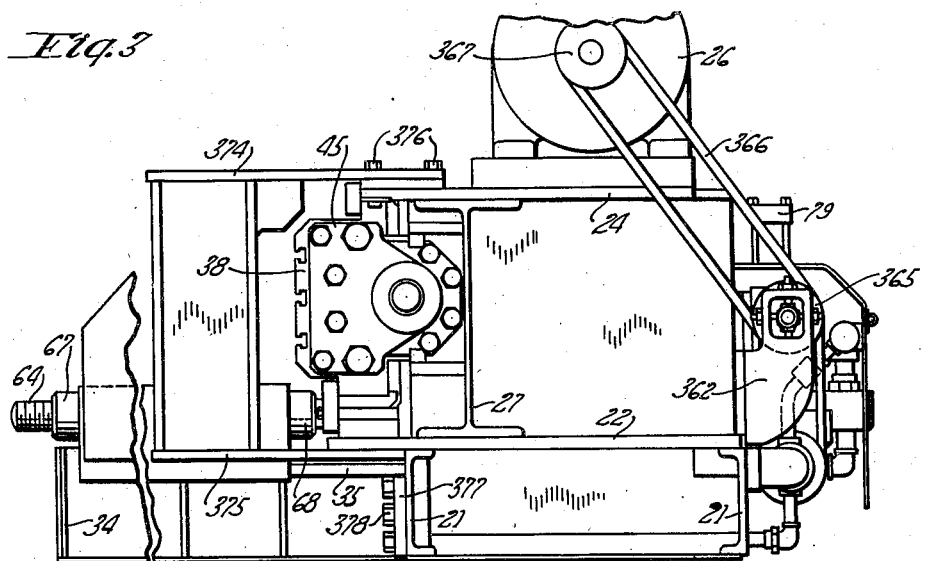
Figure 3 is a side elevational view somewhat enlarged as seen from the right hand end of Figures 1 and 2.

As was noted above, this invention pertains to improvements in a broaching machine in which the work supporting table is movable to place the work thereon in the line of movement of the broach tool. From this it will be noted that the said movable parts move in paths at right angles to one another. The said broach and table are supported by a suitable frame or bed unit which may be of any suitable or desirable configuration and either of castings or fabricated.

As shown in the drawings, the bed is of fabricated construction, that is, welded from sheets of steel and the like. Accordingly, the bed comprises a base plate 20 to which is secured channel irons 21 forming the main support for the superstructure for the broach ram. Welded to the channel irons 21 is the bed plate 22 to which in turn is secured a plurality of rib plates 23, forming between them pockets or spaces in which the several control mechanisms, such as valves and the like, are disposed. On top of the rib plates 23 is a top plate 24 forming a support for the prime movers 25 and 26, the purpose of which will be described later. The forward edge of the rib plates 23 has secured thereto the face plate 27, in turn supporting spacers 28 and ways or guides 29 and 30. The rear edge of the rib plates 23 has welded or secured thereto the rear plate 31, also supporting some of the controlling mechanism and bearings for rotating shafts and the like, all of which will be subsequently described.

Secured to the forward supporting channel iron 21 and below the broach ram supporting structure is a plate 32 to which is welded or otherwise secured the table supporting base comprising a plate 33, vertical supports 34 and top plate 35. The top plate 35 has secured thereto the guideways 36 and 37 which support the work supporting table and guide same during its movement toward and from the broach supporting mechanism.

Mounted for movement relative to the broach ways 29 and 30 is the ram 38 having guide portions 39 and 40 which respectively contact with the guides 29 and 30. The ram 38 is held against the said guides 29 and 30 by means of gibs 41 and 42, which in effect clamp the guides 39 and 40 between themselves and the guides 29 and 30. The ram 38 is provided in its forward face with a plurality of T slots 43 in which are disposed T bolts for securing the broaching tools 44 thereto. The ram 38 is adapted to be hydraulically actuated for which purpose it has secured in any desirable manner to its one end a plate 45 having an aperture therein through which the free end of a piston rod 46 passes. The other end of the piston rod 46 has secured thereto a piston 47 which is disposed in a cylinder 48. Opposite ends of the cylinder 48 are closed by suitable heads 49 and 50, the latter including a suitable stuffing box which surrounds the piston rod 46 to prevent escape of the hydraulic medium through the cylinder 48. The hydraulic circuit for effecting the operation of the piston 47 is illustrated in Figure 15 and will be described later.

Mounted on the table guides 36 and 37 is a work supporting table 51 having guide ways 52 and 53 which contact with the guides 36 and 37 and are held against one another by gibs 54. The table 51 is provided in its upper surface with T slots 55 which are adapted to receive T bolts for securing to the table suitable work fixtures and work pieces shown in the drawings in phantom lines and indicated by the reference character 56. The table 51 is adapted to be actuated by hydraulic means for which purpose the table has secured to its forward end in any desirable manner a bracket 57 receiving the free end of a piston rod 58. The other end of the rod 58 carries a piston 59 enclosed in a cylinder 60. The cylinder 60 is provided at opposite ends with cylinder heads 61 and 62, the latter of which includes a stuffing box to prevent escape of hydraulic medium from the cylinder around the piston rod 58. The hydraulic circuit for effecting the operation of the piston 59 and therefore the table 51 is shown in Figure 15 and will be described in detail later.

Passing through the work table and bed is a pair of adjusting screws and lock bars 63 and 64, see Figure 5. The said bars are each provided at opposite ends of the table 51 with screw threads 65 and 66, on which is respectively threaded nuts 67 and 68. In order to vary the position of the table 51 or change the zone through which the table moves one of the nuts 67 or 68 on each of the bars is backed away or loosened, whereupon the remaining nuts are actuated to move the table into engagement with the nuts previously loosened. The rear ends of the said bars 63 and 64 are provided with wedge shaped notches 69 and 70 into which wedges 71 and 72 are moved to lock the table 51 at each end of its movement. The wedges 71 and 72 are each secured in a carrier 73 in turn secured to a piston rod 74 by being clamped between a collar or flange 75 integral with the rod 74 and a nut 76 threaded on the rod 74. The upper end of the rod 74 has secured thereto a piston 77 enclosed within a cylinder 78 disposed between cylinder heads 79 and 80. The cylinder head 80 includes a stuffing box which surrounds the piston rod 74 and in addition provides a bracket whereby the piston and cylinder assembly are secured to the rear plate 31 of the bed. The hydraulic circuit for actuating the piston 77 is clearly illustrated in Figure 15 and will be described in detail later.

The adjusting screws and lock bars 63 and 64 are supported at their rear ends by means of half bearings 81 and 82 integral with or secured to brackets 83 and 84 which in cross section simulate angle brackets. The brackets 83 and 84 are bolted or otherwise secured to the rear angle iron 21 of the base structure and these brackets and therefore the base of the machine are positioned directly beneath the locking wedges 71 and 72 to take the thrust incident thereto.

Referring now to Figure 15, the hydraulic circuit will be described and the control valves will be likewise fully described as they are encountered in the circuit. Disposed within the bed or base of the machine is a tank indicated in Figure 15 by the numeral 85, which contains the hydraulic medium, preferably oil, to be circulated through the system. Supported by the bed and conveniently by the rear plate 31 is a pump 86 having extending from one side a suction pipe 87 which terminates in the tank 85. From the other side of the pump 86 is the pressure pipe or conduit 88 containing the hydraulic medium under pressure. Extending from the conduit 88 is a branch pressure conduit 89, which, together with the conduit 88 terminates in the valve mechanism indicated generally by the numeral 90. This valve 90 is the main control valve and adapted to initiate and stop the movements of the table 51 in opposite directions. This valve is shown structurally in Figures 4, 6, 7 and 8.

As shown in Figure 4, the valve comprises a housing 91 secured to one of the rib plates 23, preferably near the center of the length of the bed. The valve is adapted to be manually actuated for which purpose it has projecting through the casing 91 a rod 92 having integral therewith or secured thereto at its upper end a short rack 93. The rack 93 is slidable through a bracket 94 and meshes with a pinion 95 enclosed within the said bracket 94. The pinion 95 is keyed or otherwise secured to a shaft 96 journaled in the bracket 94 and a second bracket 97. The bracket 97 contains a pair of right angle mitre gears 98 which are respectively secured to the shaft 96 and a second shaft 99 which terminates in a bracket 100. Within the bracket 100 the shaft 99 has a rack and pinion connection with a lever 101 exteriorly of the said bracket.

From the foregoing it will be seen that actuation of the lever 101 toward or from the operator, as seen in Figure 1, will effect a vertical shifting of the rod 92. As seen in Figure 7, the rod 92 within the valve casing 91 is provided with a notch 102 receiving the ball end 103 of a valve actuating member 104 keyed or otherwise secured to a shaft 105 oscillatably journaled in bearings 106 and 107 within the housing 91. The valve shifter 104 has projecting from its other side an arm 108, the free or ball end of which is received in a notch 109 of a latch or locking member 110 whereby the actuation of the valve mechanism 90 is normally prohibited. The latch member 110 is pivotally mounted at 111 to a lug integral with the housing 91 and the other or free end of the latch 110 is engaged on opposite sides by a spring pressed plunger 112 and an hydraulically actuated piston plunger 113, the former shifting the latch 110 to a locking position and the latter releasing the latch so that the valve mechanism 90 may be actuated.

Keyed or otherwise secured to the shaft 105 intermediate its ends is a plate member 114 having formed therein notches 115, 116 and 117 which co-operate with a pivotally mounted dog 118; a spring 120 being provided to maintain contact between the dog 118 and the plate 114 and which also functions to cause the dog 118 and plate 114 to act as a spring loaded load and fire mechanism. Near the other end of the shaft 105 has keyed or otherwise secured to it a valve shifting finger 121 having its free end disposed within a notch 122, see Figure 8, formed in valve stem 123 of the valve member 124 whereby oscillation of the shaft 105 by the lever 101 effects the actuation of the valve member 124 of the valve mechanism 90 to initiate the movement of the work supporting table. This movement of the table is automatically arrested by automatically shifting the valve member 124 to its neutral or cut-off position.

Figure 8:
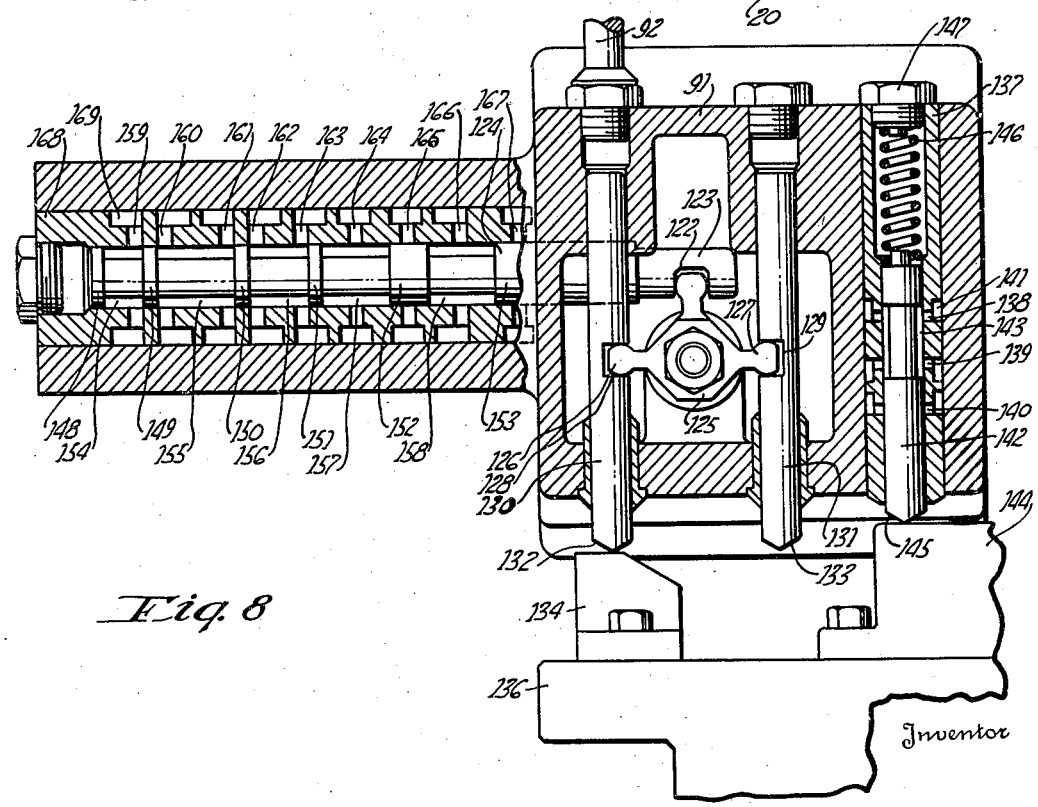
Figure 8 is a fragmentary sectional view taken on line 8—8 of Figure 6.

In order to automatically shift the valve 124 to its neutral position the oscillatable shaft 105 has keyed to it the member 125, see Figure 8, which has projecting from opposite sides thereof arms 126 and 127 respectively received in notches 128 and 129 formed respectively in plungers 130 and 131. The said plungers 130 and 131 are adapted to be vertically shifted through bearings provided by the valve casing 91 and they have their lower ends wedge shaped as at 132 and 133 for engagement with dogs 134 and 135 respectively. These dogs are secured to a dog rail 136 which in turn is keyed or otherwise secured to one of the adjusting screws or lock bars 63 and 64 which is movable directly beneath the valve casing 91.

Mounted in the valve casing 91 is a valve bushing 137 having formed therethrough a plurality of sets of radial ports 138, 139 and 140, each of which sets of ports is encircled by a similar circumferential groove 141 formed in the exterior of the bushing 137. Disposed within the bore in the bushing is a valve member 142 having formed therein a cannelure 143 for alternately connecting the ports 139 and 138 and the ports 139 and 140. The valve is movable in one direction by a dog or cam bar 144 secured to the dog rail 136 and for which purpose the valve has its lower end cam shaped as at 145. The valve 142 is held in contact with the dog or cam bar 144 and is shifted in the other direction by a spring 146 disposed above the valve and contacting therewith. The other end of the spring 146 abuts a plug 147 which closes the upper end of the bore through the valve bushing 137. The valve 142 is utilized for controlling the locking mechanism of the broach ram control valve as will be described in detail later.

The table control valve member 124 is of the sliding piston type having formed thereon piston or collar portions 148, 149, 150, 151, 152 and 153 forming between them cannelures 154, 155, 156, 157 and 158.

The valve member 124 has three positions, the neutral position shown in the drawings and an operative position to the right and to the left thereof. In each of these positions the several cannelures thereon connect in different combinations the radial ports 159, 160, 161, 162, 163, 164, 165, 166 and 167. The radial ports just enumerated are formed through a valve bushing 168 pressed into the valve casing 137 and each set of radial ports is encircled by a similar circumferential groove 169 formed in the exterior of the bushing.

It is with the ports 165 and 161 that the pressure conduits 88 and branch pressure conduit 89 respectively connect. The ports 167, 163 and 159 are respectively connected with branch conduits 170, 171 and 172 which empty into a conduit 173, in turn connected with the discharge conduit 174 which terminates in the sump or tank 85. The ports 166 and 164 have respectively connected therewith one end of conduits 175 and 176 which terminate in the table reversing valve mechanism 177 which is operated by the wedge actuating piston mechanism for controlling the flow of the fluid to the control or pilot valve for the broach ram. The ports 162 and 160 have respectively connected therewith one end of conduits 178 and 179 which terminate at their other ends in the lower and upper ends of the cylinder 78 which actuates the clamping wedges.

The valve mechanism 177 is shown structurally in Figures 5 and 14, and as there shown comprises a valve casing 180 bolted or otherwise secured to the rear bed plate 31 into which is pressed a valve bushing 181. The valve bushing 181 has formed therethrough a plurality of sets of radial ports 182, 183, 184, 185, 186, 187 and 188, each set being encircled by a similar circumferential groove 189 formed in the exterior of the bushing 181. Disposed within the bore in the bushing 181 is a piston type of valve 190 having formed thereon piston portions 191, 192, 193 and 194, providing between them cannelures 195, 196 and 197. The said cannelures are adapted in different positions to connect the radial ports in the valve bushing 181 in different combinations.

The valve member 190 has two operative positions, that shown in the drawings and a similar position to the left thereof. In order to shift the valve 190 it has integral therewith a stem 198 in which is formed a groove 199 receiving the ball end of a valve shifter 200, keyed or otherwise secured to an oscillatable shaft 201 journaled in the valve casing 180. The shaft 201 projects beyond the casing 180 and to said projection is fastened an arm 202. The arm 202 is disposed in the space provided by collars 203 and 204 carried by an extension 205 of the piston rod 74. In order to insure the proper positioning of the valve member 190 the stem 198 is additionally provided with a pair of V notches 205 cooperating with a spring pressed detent 206 which limit the movement and determine the position of the valve 190. The notches 205 and detent 206, in addition, act as a load and fire mechanism for shifting the valve past center, which position, however, would automatically follow since this valve does not control the movement of the piston 77 which actuates it.

From the foregoing it will now be seen that the valve mechanism 177 is actuated by the locking wedge piston 77 at each end of the said piston stroke.

It is with the ports 182 that the conduit 175 connects, while the ports 185 are connected with the other end of the conduit 176. The ports 183 and 184 are respectively connected with one end of conduits 207 and 208 which respectively terminate at the right and left hand ends of the table shifting cylinder 60, as seen, for example, in Figure 15. The ports 186 and 188 are respectively connected with one end of conduits 209 and 210 which respectively connect at their other ends with conduits 179 and 174, while the ports 187 connect with one end of a conduit 211 which terminates at its other end in locking plunger 212, which locks the movement of the broach pilot valve in one direction.

Extending from the pressure line 188 is a second branch pressure line or conduit 213 which terminates at its other end in the pilot or control valve mechanism 214 which controls the movement of the broach ram. This valve mechanism 214 is shown structurally together with its control parts in Figures 1, 2, 4, 9, 10 and 11. As shown in these views and particularly in Figures 1, 2 and 4 the said control mechanism comprises a valve casing or housing 215 having enlarged subhousings 216 and 217 at the opposite ends thereof, which respectively contain the valve mechanism itself and the valve actuating mechanism. Extending transversely of the housings is an oscillatable shaft 218 having secured thereto intermediate its ends a pinion 219 meshing with rack teeth formed in rod 220 intermediate the extreme ends thereof. The rod 220 is provided at opposite ends with additional rack portions having the teeth thereof meshing with pinions on shafts 221 and 222, the said rack and pinion connections being respectively enclosed in housings 223 and 224 mounted on the upper plate of the bed. The shafts 221 and 222, as seen in Figure 2, are respectively disposed on the left and right hand sides of the work supporting table 51 and to the outer ends of said shafts are secured manually actuating levers 225 and 226. From this it will be seen that the rack bar 220 may be axially reciprocated by either of the handles 225 or 226 from either side of the work supporting table for thereby effecting oscillation of the shaft 218.

Figure 10:
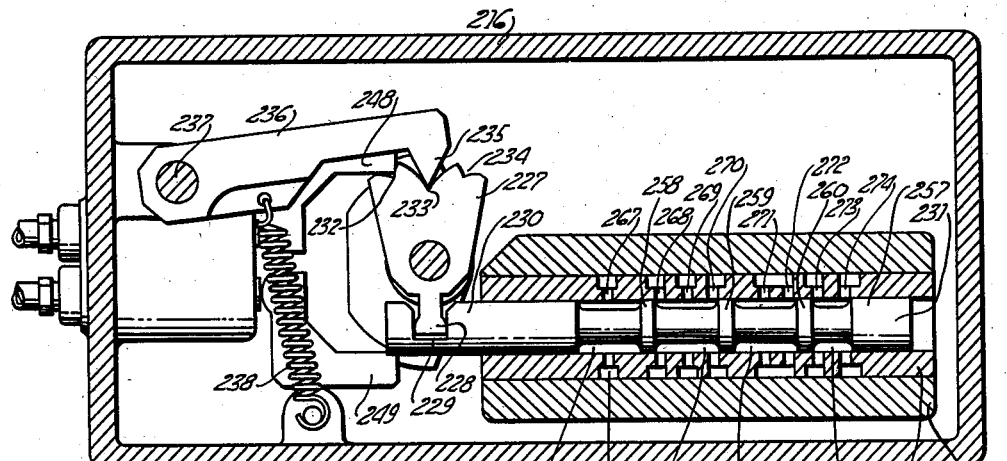
Figure 10 is a view, partly in section and partly in elevation, as seen from line 10—10 on Figure 9.
Figure 11:
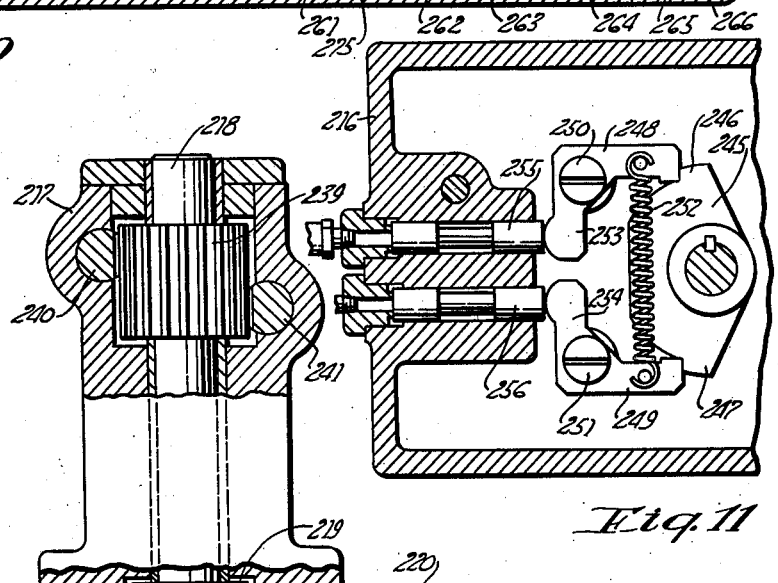
Figure 11 is a fragmentary sectional view taken on line 11—11 of Figure 9.
Figure 9:
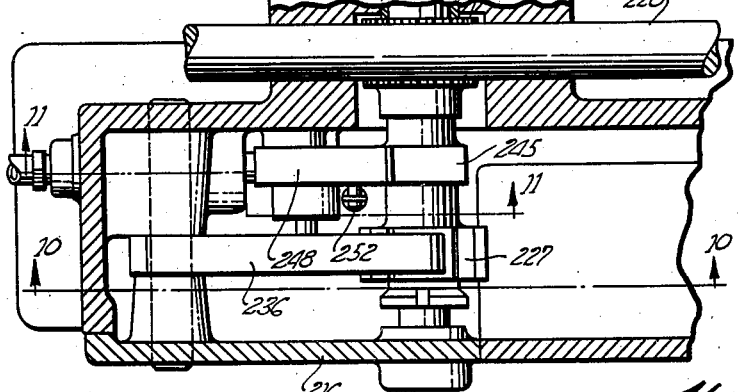
Figure 9 is a fragmentary sectional view taken on line 9—9 of Figure 4.

The shaft 218 has keyed or otherwise secured to it within the supplemental housing portion 216 a valve actuator 227, see Figure 10. The valve actuator 227 has projecting therefrom a shifter finger 228 received in a slot 229 formed in the stem 230 of the pilot valve member 231. The valve member 231 has three operative positions, a central position shown in Figure 10, and a position to the right and left thereof, one of which positions is shown in Figure 15. To properly position the said valve 231 in each of its operative positions the valve shifter 227 is provided with notches 232, 233 and 234 which co-operate with the nose 235 of a detent 236. The detent 236 is pivotally mounted at 237 within the supplemental housing 216, and yieldably actuated as by spring 238 to maintain its nose 235 in engagement with the valve shifter 227.

From the foregoing it will be noted that the valve member 231 may be manually actuated to either of its operative positions on either side of its central position. The said valve, however, is adapted to be automatically shifted from its end positions to the central position for which purpose the shaft 218 has keyed or otherwise secured to it near its outer end a relatively wide pinion 239 meshing on opposite sides with rack teeth formed in plungers 240 and 241. The plungers 240 and 241 are offset relative to one another and are shiftable through bearings provided by the supplemental housing 217. The said plungers are adapted to be actuated by dogs 241 and 243 respectively operating plungers 240 and 241. The dogs are adjustably secured in a T slot 244 formed along the upper surface of the broach ram 38, the said dogs being disposed at the end of the stroke of the ram and together determining the limits of movement thereof.

As was noted above, the table actuating circuit is interlocked with the broach ram actuating circuit wherefore the table must be in a definite position before the ram may be actuated and conversely the ram must be in a definite position before the table can be shifted. This interlocking mechanism in the present instance is had by locking and releasing the shaft 218 so that the valve mechanism may be operated only when the other parts are in the desired relationship. This locking mechanism is shown particularly in Figure 11 and comprises a locking plate 245 having formed at diametrical points lugs 246 and 247 which co-operate with latches 248 and 249 pivotally mounted at 250 and 251 within the supplemental housing 216. A spring 252 has its opposite ends connected with the latches 248 and 249 for tending to draw said latches toward one another and thereby yieldably hold same in locking position. In order to release the latches they are formed as bell cranks having their second arm 253 and 254 respectively contacting with piston plungers 255 and 256, one of which is the releasing mechanism 212 above referred to.

From the foregoing it is believed now evident how the pilot control valve for the broach ram is actuated and the interlock existing to prevent the operation of said valve except at a predetermined time in the cycle of operation of the machine, as will later be more fully described.

The pilot valve member 231 is of the sliding piston type having formed at one end thereof the piston portions 257 and between this piston portion and the stem 230 collars 258, 259 and 260. Between the said collars and piston portion are cannelures 261, 262, 263 and 264. The piston member 231 is enclosed within a valve bushing 265 pressed into a valve casing 266 enclosed within housing portion 216. The valve bushing 265 has formed therethrough a plurality of sets of radial ports 267, 268, 269, 270, 271, 272, 273, and 274 which are adapted to be connected in different combinations by the several cannelures formed in the valve member 231. Encircling each of the sets of radial ports is a similar circumferential groove 275 formed in the exterior of the bushing 265.

It is with the ports 272 that the branch pressure conduit 213 terminates, while the ports 271 are connected with one terminus of conduit 276 which terminates on one side of the ram control valve, indicated generally by the numeral 281. The ports 269, 270 and 271 are respectively connected with one end of conduits 277, 278 and 279 which terminate at their other ends in conduit 174, in turn emptying into the sump or tank 85. The ports 273 are connected with one end of a conduit 280 which terminates on the other side of the ram control valve 281. The ports 276 connect with one end of a conduit 282 which terminates at its other end in the locking or release piston plunger mechanism 284 which is the pressure actuated plunger 113 above referred to.

The ram reversing valve mechanism 281 is shown structurally in Figure 12 and is made for convenience in two parts, including the reversing valve member 285 and an unloader valve member 286. These valve members 285 and 286 are enclosed in a single casing or housing 287. The reversing valve member 285 is of the sliding piston type adapted to be shifted by hydraulic pressure and the said member comprises piston or spool portions 288, 289, 290 and 291 forming between them cannelures 292, 293 and 294. The valve member 285 is disposed in the bore in a valve bushing 295 carried by the casing or housing 287. The bushing 295 has formed therethrough a plurality of sets of radial ports 296, 297, 298, 299, 300 and 301, each set being encircled by a similar groove 302 formed in the exterior of the bushing 295.

The ends of the bushing 295 are closed by similar bonnets 303 and 304, each of which provides a bearing for plungers 305 and 306. The bonnets 303 and 304 are respectively closed by a plug 307 and 308 having formed exteriorly thereof chambers 309 and 310. The said chambers have respectively connected therewith the ends of the pipes or conduits 280 and 276.

The radial ports 296 and 299 of the bushing 295 have respectively connected therewith one terminus of branch pressure conduits 311 and 312 which terminate at their other ends in a pressure conduit 313. The ports 298 and 300 have respectively connected therewith one terminus of conduits 314 and 315 which terminate at their other ends in the left and right hand ends of the broach ram cylinder 48 for actuating the piston 47 relative thereto. The ports 297 are connected by a conduit or port 316 with the unloader valve.

As was above noted, the unloader valve member 286 is mounted in the same casing 287 as the reverser valve member 185 and this valve may be incorporated with the valve member 285, but for convenience was made as a separate part. The valve member 286 is adapted to be pressure actuated, the same as the valve 285 and has formed thereon piston portions 317 and 318 forming therebetween a cannelure 319. Contacting with the ends of the valve member 286 are piston plungers 320 and 321, each of a different cross section; wherefore, equal pressures acting thereon will always shift the valve 286 to a given position for a purpose that will later be made clear. The piston plungers 320 and 321 are slideable through bonnets 322 and 323 secured to the ends of a bushing 324 which surrounds the valve member 286. The ends of the bonnets are closed by plugs 325 and 326 through which is formed ports for conduits 327 and 328 which respectively extend from the conduits 280 and 276.

The valve bushing 324 which encircles the unloader valve member 286 has formed therethrough radial ports 329 and 330, each set being encircled by a similar circumferential groove 331 formed in the exterior of the bushing 324. It is with the ports 329 that the conduit or port 316 connects, while the ports 330 have connected therewith one end of a conduit 332 that terminates at its other end in the conduit 314.

The back pressure valve, indicated generally by the numeral 333, is illustrated in Figure 15 and connected with the ports 301 of the reversing valve mechanism 281 by a conduit 334 and is utilized to maintain a back pressure in the circuit during the movement of the broaching tools through a cutting stroke. This back pressure valve comprises a casing 335 in which is shiftable a spool type valve member 336 which has formed therein a cannelure 337. The cannelure 337 is adapted to connect the ports 338 and 339 formed through the casing 335. In practice, the ports 339 are more or less choked off, depending upon the resistance offered by the work to insure the broaching tool traveling at a uniform rate of speed and to prevent any surging or jumping of said tool during its movement. For this purpose the valve casing 335 is connected at opposite ends of the valve member 336 through choke coils or hydraulic resistances 340 and 341 with the conduit 334 and therefore the return line from the broach ram piston during the working stroke of said piston. The hydraulic resistances 340 and 341 are of different values, wherefore the flow of the hydraulic medium acting on the opposite ends of the valve member 336 is different which would normally result in a shifting of said valve member to the left, as seen in Figure 15, and closing off the ports 339, since the choke coil 340 is of the lesser value. However, to overcome this tendency the valve member 336 has contacting on one end thereof a spring 342 which abuts on its other end with an adjustable abutment 343, which combined with the pressure on this end, more or less balances the valve and shifts same to a position to permit the broach to move at a uniform rate of speed. The ports 339 are connected by a conduit or pipe 339A with the discharge conduit 316 and to prevent an excess pressure on the spring end of valve member 336 it is connected through a conduit 341A and choke coil 341B.

The operation of the back pressure valve mechanism is as follows:

Assuming the broach ram is traveling through its cutting stroke, which is to the right as seen in Figure 15, thereby exhausting the hydraulic medium ahead of the piston through the conduits 315 and 334, the flow of pressure through the hydraulic resistances 340 and 341 is such that the valve member 336 assumes a position to maintain a given flow through the ports 339. If, now, a heavy resistance is encountered the exhaust flow will materially decrease and since the resistance 340 is lower than the resistance 341 the pressure on the right hand end of the valve member 336 will be lowered, thereby permitting a shifting of the valve member 336 to the right for opening up the ports 339 and cutting down the back pressure on the broach piston. If, however, the normal resistance is suddenly lowered so that the exhaust flow is accelerated, or tends to accelerate, the pressure on the right hand end of the piston member 336 immediately increases, thereby shifting the valve to the left against the spring 342 for slowing down this excess flow and creating a higher back pressure in the system and from this it will be seen that the piston and broach ram will travel at a continuous rate of speed during its cutting stroke.

The pressure line 313 for the broach ram is connected to the pressure line 344 of a plurality of individual pump units. As shown in Figure 15, there is provided eight pumps 345, 346, 347, 348, 349, 350, 351 and 352, each of which pumps is connected by a suction pipe 353 to the sump or tank 85. The said pumps are divided into two groups 345 to 349 inclusive and 350 to 352 and each pump of each group is connected through a similar discharge pipe 354 into the main pressure conduit 344 and each of the said discharge pipes 354 contains a one-way check valve 355 whereby each pump may discharge into the pressure conduit 344 but cannot discharge through any of the other pumps.

The group of pumps including 350, 351 and 352 each have their rotors secured to a common shaft 356, see Figure 2, journaled in bearings 357 secured to and projecting from the rear bed plate 31. Secured to the shaft 356 intermediate its ends is a pulley or sheave 358 about which is trained a plurality of V belts 359. The belts 359 are in turn trained about a pulley 360 on the shaft of the variable speed prime mover or motor 25. From the foregoing it will be seen that the pumps 350, 351 and 352 are rotated whenever the motor 25 is driven and the said pumps discharge into the main pressure conduit or pipe 344.

The larger group of pumps 345 to 349 inclusive are each individually driven from a single countershaft 361 rotatably journaled in bearings 362 projecting from the rear bed plate 31. Loosely mounted on the countershaft 361 is a plurality of sheaves 363, one for each of the pumps 345 to 349 inclusive. The said sheaves 363 are adapted to be connected with the shaft 361 by means of clutches 364, which, as is usual practice, is slidably keyed to the said shaft. From this it will be seen that one or more of the said pumps 345 to 349 inclusive may be connected to the shaft 361 for effecting their operation and thereby effect a discharge into the main pressure conduit or pipe 244. In order to rotate the countershaft 361 it has secured to it intermediate its ends a sheave or pulley 365 connected by multiple V belts 366 or the like to a pulley 367 on the rotor shaft of the prime mover 26.

When the smaller group of pumps 350 to 352 inclusive is employed a definite amount or volume of hydraulic medium is discharged into the conduit 344 for effecting the operation of the broaching piston and consequently the broach. The maximum output of this group of pumps will result in a certain definite rate of speed. In the event it is desired to increase this rate of speed it is only necessary to cut in one or more of the group of pumps 345 to 349 inclusive. In other words, the rate of actuation of the ram and its piston and cylinder mechanism is variable at definite increments, and since the motor for the pumps of the smaller groups 350 to 351 inclusive is variable between certain limits the rate of actuation of the broach may be varied between each major step in the speed of the broach movement from the maximum of the pumps 350 to 352 inclusive to the maximum of said pumps plus the other pumps.

From the foregoing it will now be evident that there has been provided two independent transmission mechanisms, one for actuating the broach ram and deriving its power from the pumps 345 to 352 and the second for actuating the work supporting table and deriving its power from the pump 86, the latter also supplying the force for actuating the interlocking mechanisms between the two circuits.

The complete operation of the machine is as follows, having particular reference to Figure 15:

As shown in this figure the work supporting table is to its right hand position, that is, with the work in the line of movement of the broach tools on the ram. The piston 47 is being actuated to the right for causing the broach tools to traverse the work and effect a stock removal from the work. The hydraulic fluid at this time is flowing to the left side of the piston 47 and is as follows:

Depending upon the nature of the work being broached, one or more of the pumps 345 to 349 inclusive is being actuated in addition to the pumps 350 to 352 inclusive, each discharging into the pressure conduit 344. The medium flows through this conduit 344 to the conduits 313 and 312 through the reversing valve mechanism 281 by way of ports 299 and 298 to the conduit 314 from which it enters the cylinder 48 for actuating the piston 47, as above mentioned, to the left. The hydraulic medium at this time ahead of the piston 47 is being exhausted through the conduit 315 and reversing valve mechanism 281 by way of the ports 300 and 301 to the conduit 344. The flow of the medium from the conduit 20 334 is through the back pressure valve 333 to the main exhaust conduit 316 and the tank 85. The piston 47, and consequently the broach ram, continues to move to the left until one of the dogs 342 or 343 engages with one of the plungers 130 or 131 for shifting same and shifting the pilot valve member 231 to its central position, which is to the right of that shown in Figure 15.

The shifting of the pilot valve member 231 to its central position connects the control pressure line 213 with the conduits 280 and 276 by way of the ports 272, 273 and 271, thereby shifting the reversing valve member for the ram to its central position shown in Figure 12 without, however, shifting the unloading valve member 35 286 since at this time there will be equal pressures acting on the plungers 320 and 321, and since plunger 321 is of a larger area the valve will remain in its position to the right. At the same time the pressure in branch control pressure line 282 will be connected with the conduit 283 by way of ports 267 and 268 for acting on the locking mechanism 284. This operation causes the piston plunger 113 to move to the right, as seen in Figure 7, thereby shifting the lever 110 out of locking position. The parts will remain in this position with the broach ram in its right hand position and the table inwardly with the completed work thereon until the table is manually operated.

The lever 101 is therefore engaged to shift the table control valve and effect a retraction of the table from the broach. The table control valve member 124 is therefore shifted to the right, as seen in Figure 15, for connecting the pressure in conduit 88 with the conduit 76 through the ports 164 and 165. At the same time the pressure in branch pressure conduit 89 is connected with the conduit 178 through the ports 161 and 162. The medium flowing through the conduit 178 acts on the lower surface of the wedge locking piston 77 for raising said piston and thereby unlocking the table. The movement of the piston exhausts the medium ahead of it outwardly through the conduit 179 and through the ports 160 and 159 to the discharge conduits 172 and 173 and the main discharge conduit 174. When the piston 77 reaches its upper limit of movement it operates the table reversing valve mechanism 177 by shifting the valve member 190 to the left as seen in Figure 15.

The movement of this valve member connects the pressure conduit 175 through the ports 182 and 183 with the conduit 207 which terminates at the right hand end of the table cylinder 60 for shifting the piston 59 therein to the right and retracting the table and work from proximity with the broach. The medium on the other side of the piston 59 is exhausted through the conduit 208, ports 184 and 185 of the valve mechanism 177, conduit 176, ports 164 and 163 of the valve mechanism 90 and discharge conduits, including 171, 173 and 174, to the sump. The work and table continue to move to the left until the dog 135 on the table lock bar shifts the control valve member 124 to its neutral position, thereby cutting off the flow of the pressure medium from the conduit 188 to the conduit 166 and stopping the movement of the table. Near the end of the table stroke the valve member 142 rides off of the cam plate 144, thereby permitting the spring 146 to shift same and release the broach ram pilot valve.

The shifting of the valve member 142 downwardly, as seen in Figure 15, upon riding off of the cam plate 144 connects the branch pressure conduit 213A with the conduit 213B which terminates at the second of the release piston plungers 255 and 256. This actuates the proper bell crank latch 248 or 249 so that the pilot valve mechanism may be operated. This pilot valve may be operated from either of the handles 225 or 226, and may now be shifted to its right hand operative position as seen in Figure 15. This position of the pilot valve connects the pressure in the conduit 213 with the conduit 280 by way of ports 272 and 273, thereby directing the pressure to the right hand ends of the broach ram reversing valve member and the unloaded valve member. At the same time the other ends of these valve members are connected by conduits 276 and 328 with the branch and main discharge conduits 278 and 174 by way of ports 271 and 270. From this it will follow that the valve members 285 and 286 are shifted to their left hand positions. At this time the conduit 313, through conduit 312, is connected with the conduit 315 by way of ports 229 and 300. At the same time the conduit 314 is connected with the discharge conduit 316 by way of ports 298 and 297, while the conduit 314 is also connected through the conduit 332 with the conduit 316 through the unloader valve casing by way of ports 330 and 329. It will be noted that the conduit 316 is the main discharge conduit and by-passes the back pressure valve 333. Therefore, the piston 47 and ram will be actuated at a rapid rate to the left or in a retracting direction.

As soon as the ram reaches the end of its stroke the other of the dogs 242 or 243 shifts the pilot valve member 231 to its neutral position, thereby again connecting the pressure in the conduit 213 with the conduits 276 and 280 for shifting the unloader valve member 286 to its right hand or normal position and the reversing valve member 285 to a central position, thereby cutting off the flow of the fluid to the ram piston. The parts will remain in this position until the table control valve 124 is again manually actuated.

The work table is actuated slightly beyond its operative position, that is, with the work projecting into the path of the tool a greater amount than the amount of stock to be removed. As was above described, after the table has been actuated to the limit of its movement by the piston 59, as determined by the dog 134, the wedge locking piston and cylinder mechanism is set in motion. The wedges 71 and 72 enter the notches 70 in the locking bars and through the cam action of the co-operating inclined faces on the said wedges and notches shift the table to the desired position. This shifting is, of course, in a direction away from the broach tool since the table had shifted an unwonted distance into the path of the tool. Prior to the actual shifting of the table the valve mechanism 177 is actuated by the said wedges. This shifting of the valve mechanism 177 connects both sides of the table shifting piston 59 through the conduits 207 and 208 and the ports 183 and 184 so that the fluid discharged from one side of said piston, due to the shifting thereof, is placed on the opposite side thereof. It will be noted, however, that the piston faces are of different areas due to the piston rod on one of them; therefore, some make-up fluid is necessary to take care of the resulting void on the side of the piston opposite to the piston rod. This make-up fluid is sucked into the cylinder by the piston through the conduits 207 and 208 from the sump by way of the discharge conduit 174 and the choke coil 208A connecting the conduit 208 with pipe or conduit 174. This choke coil, however, in no wise interferes with the normal operation of the mechanism as when the pressure is flowing through the conduit 208 to actuate the piston 59 to the right.

In order to maintain a constant unit pressure in the system which operates the broach ram the pressure conduit 313 is connected by way of conduit 313A with a relief valve 313B which may be of any suitable or desirable construction, the relief valve 313B being in turn connected by conduit 313C with the sump or tank 85.

From the foregoing it will be noted that two independent hydraulic systems have been provided, one for actuating the table to and from a work operative position and for supplying pressure to control the operation of the interlocks and the second system for effecting the operation of the broach tool ram. At the same time the two systems are interlocked with one another to prevent the operation of the table except when the ram is at a desired or necessary position and to prevent the operation of the ram except when the work is in the proper or desired position to be operated upon, these interlocks being so provided as to prevent the manual actuation of the pilot or control valves in each of the systems.

As was noted above, the work supporting table is provided in its surface with T slots 55 utilizable for securing work or work clamping fixtures to the table 51. Secured to one side of the table, here shown as the right hand side because the broach tool moves to the right, see Figure 1, when effecting the broaching cut is a plate 370 against which the work is also clamped or preferably braced by bracing block 371. The table plate 370 slides against a vertical thrust plate 372 which is secured to or carried by a second vertical plate 373 abutting adjacent edges of horizontal braces 374 and 375. The braces 374 and 375 are respectively disposed above and below the ram and its guide ways and are secured to the main bed. As shown in Figures 1, 2 and 3, the upper brace 374 is disposed on the upper surface of the top plate 24 and is securely bolted thereto by numerous bolts 376, while the lower brace 375 abuts the forward face of the main longitudinal channel 21, being secured to said channel by means of a turned down flange 377 and bolts 378. The upper brace, in addition to being bolted to the top plate 24, has its extreme end notched, as at 379 in Figure 2, to form a seat which engages an anchor plate 380 solidly welded to the top plate 24.

When the work piece is in position to be operated on by the broach tool the work table plate 370 contacts with the intermediate thrust plate 372 which is carried by the bed through the braces 374 and 375 and their spacing end plate 373. Since the broach is moving to the right to effect a cut on the work the thrust due to the cut on the work will therefore also be to the right. This thrust instead of being taken by the table ways is either through the brace 371 between the work and table plate 370 and plates 372, 373 and upper and lower braces 374 and 375. From this it will be seen that the main supporting frame or bed itself takes the thrust instead of the relatively weaker member, the work supporting table as was the practice in the past.

What is claimed is:

1. In a broaching machine the combination of a bed having formed thereon guide ways, a broaching tool ram mounted on said guide ways for movement relative thereto, additional guide ways on said bed, a work supporting table mounted on said additional guide ways for movement relative thereto for presenting a work piece to the action of a broaching tool on the ram, and means carried by the bed and work supporting table whereby the thrust incident to the broaching cut is taken by the bed instead of the table guide ways.

2. In a broaching machine of the class described the combination of a main supporting bed having formed thereon guide ways, a ram supporting a broaching tool mounted on said guide ways for movement relative thereto, a supplemental supporting bed having formed thereon guide ways, a work supporting table mounted on said supplemental guide ways, means for shifting the work supporting table relative to its guide ways to dispose a work piece thereon in the path of movement of the broach tool, and co-operating means carried by the work supporting table and main bed whereby the thrust incident to the broaching cut is taken wholly by the main supporting bed.

3. In a broaching machine of the class described the combination of a main supporting bed having formed thereon guide ways, a ram supporting a broaching tool mounted on said guide ways for movement relative thereto, a supplemental supporting bed having formed thereon guide ways, a work supporting table mounted on said supplemental guide ways, means for shifting the work supporting table relative to its guide ways to dispose a work piece thereon in the path of movement of the broach tool, and co-operating means carried by the work supporting table and main bed whereby the thrust incident to the broaching cut is taken wholly by the main supporting bed, including a pair of thrust plates, one being carried by the table and the other by the bed, and the former having positive contact with the work.

4. In a broaching machine of the class described the combination of a main supporting bed having formed thereon guide ways, a ram supporting a broaching tool mounted on said guide ways for movement relative thereto, a supplemental supporting bed having formed thereon guide ways, a work supporting table mounted on said supplemental guide ways, means for shifting the work supporting table relative to its guide ways to dispose a work piece thereon in the path of movement of the broach tool, co-operating means carried by the work supporting table and main bed whereby the thrust incident to the broaching cut is taken wholly by the main supporting bed, including a pair of thrust plates, one being carried by the table and the other by the bed, and the former having positive contact with the work, and brace means carried by the bed and supporting at their forward end the bed thrust plate.

5. In a broaching machine of the class described the combination of a main supporting bed having formed thereon guide ways, a ram supporting a broaching tool mounted on said guide ways for movement relative thereto, a supplemental supporting bed having formed thereon guide ways, a work supporting table mounted on said supplemental guide ways, means for shifting the work supporting table relative to its guide ways to dispose a work piece thereon in the path of movement of the broach tool, co-operating means carried by the work supporting table and main bed whereby the thrust incident to the broaching cut is taken wholly by the main supporting bed, including a pair of thrust plates, one being carried by the table and the other by the bed, and the former having positive contact with the work, brace means carried by the bed and supporting at their forward end the bed thrust plate, and means for positively locking the work supporting table in its operative position.

6. In a broaching machine of the class described the combination with a fabricated main bed having slideably supported thereon a broach tool ram, of a supplemental fabricated bed supporting a work supporting table for movement in an angular direction with respect to the ram movement, and co-operating means carried by the work supporting table and main bed whereby the thrust incident to the broaching cut is taken by the main bed instead of the supplemental bed.

7. In a broaching machine of the class described the combination with a fabricated main bed having slideably supported thereon a broach tool ram, of a supplemental fabricated bed supporting a work supporting table for movement in an angular direction with respect to the ram movement, co-operating means carried by the work supporting table and main bed whereby the thrust incident to the broaching cut is taken by the main bed instead of the supplemental bed, including a thrust plate carried by the work supporting table for movement therewith and positively backing the work clamped on the table, a second thrust plate having sliding engagement with the table thrust plate for backing up same, and braces supporting the second thrust plate whereby the strain is taken by the main bed.

8. In a broaching machine of the class described the combination with a fabricated main bed having slideably supported thereon a broach tool ram, of a supplemental fabricated bed supporting a work supporting table for movement in an angular direction with respect to the ram movement, co-operating means carried by the work supporting table and main bed whereby the thrust incident to the broaching cut is taken by the main bed instead of the supplemental bed, including a thrust plate carried by the work supporting table for movement therewith and positively backing the work clamped on the table, a second thrust plate having sliding engagement with the table thrust plate for backing up same, braces supporting the second thrust plate whereby the strain is taken by the main bed, means for locking the work supporting table in its operative position, and means for effecting the operation of the broach tool ram and table.

9. In a broaching machine of the class described the combination of a bed, a broaching tool mounted thereon for translation relative thereto, a work supporting table carried by the bed for movement relative thereto transversely of the line of movement of the broaching tool, independent power means for actuating the broaching tool and table, independent means for controlling the operation of said power means, and a plurality of independent hydraulically operated locking plungers reacting on said independent control means for selectively determining the actuability thereof.

10. In a broaching machine of the class described the combination of a bed, a broaching tool mounted thereon for translation relative thereto, a work supporting table carried by the bed for movement relative thereto transversely of the line of movement of the broaching tool, independent power means for actuating the broaching tool and table, independent means for controlling the operation of said power means, interlocks between the said power means whereby they may be sequentially operated, said interlocks including a plurality of hydraulically operated locking plungers and a control circuit selectively couplable to shift one or another of said plungers whereby a selected independent control means is rendered effective, and power actuated means for locking the work supporting table in its operative positions.

11. In a broaching machine of the class described the combination of a bed, a broaching tool mounted thereon for translation relative thereto, a work supporting table on said bed for movement relative thereto transversely of the direction of movement of the broaching tool, power means for effecting the operation of the broaching tool, additional power means for effecting the operation of the work supporting table, control means for controlling the operation of the broach tool power means, control means for controlling the operation of the table power means, and interlocks between the said control means whereby they may be actuated only in predetermined sequence, said interlocks including a plurality of normally effective latch devices for locking the several control means against movement, hydraulic release devices for said latches, and means for determining the individual effect of the release devices on their respective latches.

12. In a broaching machine of the class described the combination of a bed, a broaching tool mounted thereon for translation relative thereto, a work supporting table on said bed for movement relative thereto transversely of the direction of movement of the broaching tool, power means for effecting the operation of the broaching tool, additional power means for effecting the operation of the work supporting table, control means for controlling the operation of the broach tool power means, control means for controlling the operation of the table power means, interlocks between the said control means including locking devices for the individual control means and hydraulic actuating circuits energizable upon the shifting of one of the control means for determining the effectiveness of the locking device for the other control means whereby they may be actuated only in predetermined sequence, means for positively locking the table in its operative positions, and connections between the table control means and locking means whereby they are actuated sequentially.

13. In a broaching machine of the class described the combination of a bed, a broach ram mounted thereon for movement relative thereto, a piston and cylinder mechanism for actuating the said ram, a conduit from each end of the cylinder, a pressure source, means for alternately connecting the pressure source with the cylinder conduits, independent additively employable pump means for varying the pressure source output by definite increments whereby the speed of the ram may be progressively varied, and additional variable delivery pump means for varying the pressure source output by amounts less than the incremental difference between respective additive pump means.

14. In a broaching machine of the class described the combination of a bed, a broach ram mounted thereon for movement relative thereto, a piston and cylinder mechanism for actuating the said ram, a conduit from each end of the cylinder, a pressure source, means for alternately connecting the pressure source with the cylinder conduits, means for varying the pressure source by definite increments whereby the speed of the ram may be progressively varied, including a plurality of independent pump units, means for successively cutting in the individual pump units, and additional pump units having a variable output for supplementing the first mentioned pump units and effecting a variation in the pressure source between each of the first mentioned pump units.

15. In a broaching machine of the class described the combination of a bed, a broaching tool mounted thereon for translation relative thereto, a work supporting table mounted on the bed for movement relative thereto in a direction transversely of the direction of movement of the broaching tool to present a work piece to the action of said tool and retract the work therefrom, independent piston and cylinder mechanisms for effecting the operation of the broaching tool and work supporting table, independent hydraulic circuits for actuating the said piston and cylinder mechanisms, a control valve for each circuit, locking devices normally preventing actuation of the control valves, and an hydraulic control circuit interconnecting each control valve with the locking devices of the other whereby actuation of either of said valves will react on the locking device of the other to determine its potential subsequent actuation.

16. In a broaching machine of the class described the combination of a bed, a broaching tool mounted thereon for translation relative thereto, a work supporting table mounted on the bed for movement relative thereto in a direction transversely of the direction of movement of the broaching tool to present a work piece to the action of said tool and retract the work therefrom, independent piston and cylinder mechanisms for effecting the operation of the broaching tool and work supporting table, independent hydraulic circuits for actuating the said piston and cylinder mechanisms, a control valve for each circuit, locking devices normally preventing actuation of the control valves, an hydraulic control circuit interconnecting each control valve with the locking devices of the other whereby actuation of either of said valves will react on the locking device of the other to determine its potential subsequent actuation, and a work table controlling mechanism including an additional piston and cylinder device, a table locking member actuable thereby, an auxiliary valve, and a lost motion actuating connection between the piston and cylinder of the locking device and said last mentioned valve for actuation of the latter in predetermined relation to the position of the locking device.

17. A broaching machine of the character described including an hydraulically actuable broaching ram and an hydraulically shiftable table for effecting presentation of work to the ram, a first high pressure hydraulic circuit including a multiple number of pumps selectively employable for actuation of the broaching ram at variable working rates, an additional hydraulic circuit including an independent fluid pressure supply means for determining the actuation of the table, a first valve means for controlling the multiple pump flow with respect to the broach ram, and an hydraulic circuit for determining the effective position of said valve means including conduits coupled therewith, an auxiliary control valve therefor, and means coupling the table actuating source of pressure with said auxiliary control valve for ultimate determination of the operative effect of the multiple pump pressure circuit with respect to the ram.

18. A broaching machine of the character described including an hydraulically actuable broaching ram and an hydraulically shiftable table for effecting presentation of work to the ram, a first high pressure hydraulic circuit including a multiple number of pumps selectively employable for actuation of the broaching ram at variable working rates, an additional hydraulic circuit including an independent fluid pressure supply means for determining the actuation of the table, a first valve means for controlling the multiple pump flow with respect to the broach ram, an hydraulic circuit for determining the effective position of said valve means including conduits coupled therewith, an auxiliary control valve therefor, means coupling the table actuating source of pressure with said auxiliary control valve for ultimate determination of the operative effect of the multiple pump pressure circuit with respect to the ram, locking devices normally effective to restrain the auxiliary control valve in neutral position, a table control valve, and hydraulic connections between the table control valve and the locking devices for the auxiliary valve for selectively releasing certain of said auxiliary valve locking devices.

19. In a machine of the character described the combination with a broach actuating ram, of an hydraulic motor for operation thereof, a table for presentation of work to the ram, an hydraulic motor for actuation of the table, a first valve device for determining application of hydraulic power to the broach ram, a second hydraulic valve for determining application of hydraulic power to the table motor, motor operated means for moving the respective valves to a neutral position, locking devices individual to the respective valves for automatically securing same in said neutral position, and hydraulic control circuits interlocking the locking devices of each valve with ports of the other valve whereby a shifting of either valve will react through said circuits on the locking devices of the other.

MILLARD ROMAINE.